US006549651B2

(12) United States Patent
Xiong et al.

(10) Patent No.: US 6,549,651 B2
(45) Date of Patent: *Apr. 15, 2003

(54) ALIGNING RECTILINEAR IMAGES IN 3D THROUGH PROJECTIVE REGISTRATION AND CALIBRATION

(75) Inventors: Yalin Xiong, Montrose, CA (US); Ken Turkowski, Menlo Park, CA (US)

(73) Assignee: Apple Computers, Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/077,102

(22) Filed: Feb. 14, 2002

(65) Prior Publication Data

US 2002/0114536 A1 Aug. 22, 2002

Related U.S. Application Data

(63) Continuation of application No. 09/160,822, filed on Sep. 25, 1998, now Pat. No. 6,434,265.

(51) Int. Cl.[7] ................................................. G06K 9/00
(52) U.S. Cl. ........................ 382/154; 345/629; 382/284; 382/294
(58) Field of Search ................................. 382/305, 284, 382/294, 254, 154, 299, 260, 252, 253, 275, 276; 345/427, 433, 629

(56) References Cited

U.S. PATENT DOCUMENTS

| 5,664,082 A | 9/1997 | Chen et al. |
| 6,097,854 A | 8/2000 | Szeliski et al. |
| 6,434,265 B1 * | 8/2002 | Xiong et al. ................. 382/154 |

OTHER PUBLICATIONS

Xiong, Yalin, et al., "Creating Image–Based VR Using a Self Calibrating Fisheye Lens," IEEE, 1997, pp. 237–243.

McMillan, Gary, et al., "Plenoptic Modeling: an Image–Based Rendering System," Computer Graphics Proceedings, Annual Conference Series, 1995, pp. 39–46.

Szeliski, Richard, et al., "Creating Full View Panoramic Image Mosaics and Environment Maps," Computer Graphics Proceedings, Annual Conference Series, 1997, pp. 251–258.

(List continued on next page.)

*Primary Examiner*—Bhavesh Mehta
*Assistant Examiner*—Sheela Chawan
(74) *Attorney, Agent, or Firm*—Fenwick & West LLP (57) ABSTRACT

An improved apparatus and method for creating high quality virtual reality panoramas is disclosed that yields dramatic improvements during the authoring and projecting cycles, with speeds up to several orders of magnitude faster than prior systems. In a preferred embodiment, a series of rectilinear images taken from a plurality of rows are pairwise registered with one another, and locally optimized using a pairwise objective function (local error function) that minimizes certain parameters in a projective transformation, using an improved iterative procedure. The local error function values for the pairwise registrations are then saved and used to construct a quadratic surface to approximate a global optimization function (global error function). The chain rule is used to avoid the direct evaluation of the global objective function, saving computation. In one embodiment concerning the blending aspect of the present invention, an improved procedure is described that relies on Laplacian and Gaussian pyramids, using a blend mask whose boundaries are determined by the grassfire transform. An improved iterative procedure is disclosed for the blending that also determines at what level of the pyramid to perform blending, and results in low frequency image components being blended over a wider region and high frequency components being blended over a narrower region. Human interaction and input is also provided to allow manual projective registration, initial calibration and feedback in the selection of photos and convergence of the system.

20 Claims, 7 Drawing Sheets

OTHER PUBLICATIONS

Nayar, Shree K., "Catadioptric Omnidirectional Camera," IEEE 1997, pp. 482–488.

Chen, Shenchang Eric, "QuickTime® VR–an Image–Based Approach to Virtual Environment Navigation," Computer Graphics Proceedings, Annual Conference Series, 1995, pp. 29–38.

Szeliski, Richard, "Video Mosaics for Virtual Environments," IEEE Computer Graphics and Applications, Mar. 1996, pp. 22–30.

Arcelli, C., et al., "A Grassfire Transformation for Binary Digital Pictures," pp. 152–154.

Burt, Peter J., et al., "A Multiresolution Spline with Application to Image Mosaics," ACM Transactions on Graphics, vol. 2, No. 4, Oct. 1982, pp. 217–236.

Peleg, Shmuel, "Elimination of Seams from Photomosaics," Computer Graphics and Image Processing 16, 1981, pp. 90–94.

Peleg, Shmuel, "Panoramic Mosaics B Manifold Projection," IEEE 1997, pp. 338–343.

Sawhney, Harpreet S., et al., "True Multi–Image Alignment and its Application to Mosaicing and Lens Distortion Correction," IEEE 1997, pp. 450–456.

Szeliski, Richard, "Image Mosaicing for Tele–Reality Applications," IEEE 1994, pp. 44–53.

"Computer Graphics—Proceedings CD–ROM," Aug. 4–9, 1996.

Rushmeier, Holly, "Computer Graphics Proceedings," Aug. 4–9, 1996.

Gortler, Steven J., et al., "The Lumigraph."

Debevec, Paul E., et al., "Modeling and Rendering Architecture from Photographs: a Hybrid Geometry–and Image–Based Approach," to Appear in the SIGGRAPH Conference Proceedings, pp. 1–10.

Levoy, Marc, et al., "Light Field Rendering," Stanford University, pp. 1–12.

"Computer Graphics Proceedings CD–ROM," Aug. 3–8, 1997.

Szeliski, Richard, et al., Creating Full View Panoramic Image Mosaics and Environment Maps, SIGGRAPH 97 Conference Proceedings.

Larson Gregory Ward, et al., A Visibility Matching Tone Reproduction Operator for High Dynamic Range Scenes, IEEE 1997, pp. 291–306.

Xiong, Yalin et al., "Creating Image–Based VR Using a Self–Calibrating Fisheye Lens," 1997 IEEE, pp. 237–243.

McMillan, Leonard, et al., "Plenoptic Modeling: an Image–Based Rendering System," SIGGRAPH 95, Los Angeles, Aug. 6–11, 1995, pp. 39–46.

Szeliski, Richard, et al., "Creating Full View Panoramic Image Mosaics and Environment Maps," SIGGRAPH 97, Los Angeles, CA, Aug. 3–8, 1997, pp. 251–258.

Nayar, Shree K., "Catadioptric Omnidirectional Camera," 1997 IEEE, pp. 482–487.

Chen, Shenchang Eric, "Quick–Time® VR—an Image–Based Approach to Virtual Environment Navigation," SIGGRAPH 95, Los Angeles, CA, Aug. 6–11, 1995, pp. 29–38.

Szeliski, Richard, "Video Mosacis for Vitrual Environments," Mar. 1996 IEEE, pp. 22–30.

Arcelli, L. Cordella, et al., "A Grassfire Transformation for Binary Digital Pictures," Laboratorio de Cibernetica del C.N.R., pp. 152–154.

Burt, Peter J., et al., "A Multiresolution Spline with Application to Image Mosaics," ACM Transactions on Graphics, vol. 2, No. 4, Oct. 1983, pp. 217–236.

Peleg, Shmuel, "Elimination of Seams from Photomosaics," Computer Graphics and Image Processing 16, 1981, pp. 90–94.

Peleg, Shmuel, et al., "Panoramic Mosaics by Manifold Projection," 1997 IEEE, pp. 338–343.

Sawhney, Harpreet S., et al., "True Multi–Image Alignment and its Application to Mosaicing and Lens Distortion Correction," 1997 IEEE, pp. 450–456.

Szeliski, Richard, "Image Mosaicing for Tele–Reality Applications," 1994 IEEE, pp. 44–53.

"ACM SIGGRAPH 96 Proceedings CD–ROM—Comp Soft T 385 S4.5 1996b," disk packaging, 2 pgs.

"Computer Graphics Proceedings," ACM Siggraph, Aug. 4–9, 1996, 3 pgs.

Gortler, Steven J., et al., "The Lumigraph," 10 pgs.

Debevec, Paul E., et al., "Modeling and Rendering Architecture from Photographs: A Hybrid Geometry—and Image–Based Approach," to appear in the Siggraph Conference Proceedings, pp. 1–10.

Levoy, Marc, et al. "Light Field Rendering," Computer Science Department, Stanford University, pp. 1–12.

"ACM SIGGRAPH 96 Proceedings CD–ROM—Comp Soft T 385 S4.5x 1997b," disk packaging, 2 pgs.

Szeliski, Richard, et al., "Creating Full View Panoramic Image Mosaics and Environment Maps," Siggraph 97 Conference Proceedings, 10 pgs.

Larson, Gregory Ward, et al., "A Visibility Matching Tone Reproduction Operator for High Dynamic Range Scenes," IEEE Oct. Dec. 1997, vol. 3, No. 4, pp. 291–306.

"QuickTime VR Authoring Studio—User's Manual," © 1997 Apple Computer, Inc.

"QuickTime VR 2.0 Authoring Tools Suite—Using the QuickTime VR Authoring Tools," Manual, © 1997 Apple Computer, Inc.

* cited by examiner

| | | | |
|---|---|---|---|
| NUMBER OF ROWS | [ ] 602 | [ ] 620 | MISC NUMBERS |
| INTRA-ROW FOR FIRST ROW: | 604 | 608 | |
| INIT PAN | [0] | PAN INCREMENT | [30] |
| INIT TILT | [0] | INIT ROLL | [0] |
| | 612 606 | 610 | 616 |
| INTER-ROW: | | | |
| PAN INCREMENT | [0] | TILT INCREMENT | [45] |
| ROLL INCREMENT | [0] | | |
| | 614 | [CANCEL] | [OK] |

ALIGNING RECTILINEAR IMAGES IN 3D THROUGH PROJECTIVE REGISTRATION AND CALIBRATION

RELATED PATENT APPLICATION

This is a continuation of U.S. patent Ser. No. 09/160,822, filed Sep. 25, 1998 now U.S. Pat. No. 6,434,265B1 issued Aug. 13, 2002.

BACKGROUND OF THE INVENTION

1. Field of Invention

The present invention relates generally to an improved system for creating a full 360-degree virtual reality panorama from rectilinear images.

A panorama is a compact representation of the environment viewed from a 3D position. While an ordinary image can capture only a small portion of the environment, a panorama can capture it all, or any portion of it, depending on the geometry in which the panoramas are represented. Recently there has been an explosive popularity of panoramas on the world wide web and in multimedia as an effective tool to present a photo-realistic virtual reality. However, creating high-quality panoramas, especially those that completely enclose space, has been difficult

2. Description of Related Art

Various systems have been proposed for simulating a virtual reality environment using photographic quality images. Many virtual reality environments use 3D models or mathematical equations to create a simulated world. The user explores this simulation in real time. Though 3D modeling via equations has certain advantages, such as a depiction of a scene from any arbitrary vantage point, creating images from equations generated by a computer is seriously limited by the speed of the computer. To avoid this problem, technology such as QuickTime™ VR from Apple Corporation uses images that have already been produced, either photographically or generated by a 3D modeling program, and stored in secondary memory. Software only has to read the image files from a disk and display the scene as needed, rather than calculating the scene from mathematical models. However, a limitation of the QuickTime™ VR program is that it requires that the view direction for all photos reside in a single plane, such as that obtained by rotating a camera on a tripod. It also requires that the vertical field of view (or equivalently, the focal length) be known, and that there be roughly equal angular increments between one photo and the next.

Further, a panoramic movie or image can be created using specialized hardware, such as with a panoramic camera or a fisheye lens camera. However, such hardware is inconvenient for the average novice photographer. In the alternative, software can be used to simulate a panorama. This obviates the need for specialized hardware.

Though various software programs have been proposed to simulate panoramas without the use of special hardware, these programs have certain serious drawbacks that have not been successfully overcome to date. These include, but are not limited to, unrealistic representations of images, lack of proper registration and calibration of images, lack of proper blending of images, and slow speed in registering, calibrating and blending images to create a panorama.

SUMMARY OF THE INVENTION

Accordingly, one aspect of the present invention is to provide an improved system and method for overcoming the drawbacks of prior techniques discussed above.

Another aspect of the present invention is to provide for the registration, calibration and global optimization of images, preferably captured from a substantially single nodal position. The solution to creating a full 360-degree panorama quickly and seamlessly is divided into three steps. The first step registers all overlapping images projectively. A combination of a gradient-based optimization method and a correlation-based linear search has proved to be robust in cases of drastic exposure differences and small amount of parallax. The second step takes the projective matrices and their associated Hessian matrices as inputs, and calibrates the internal and external parameters of every image through a global optimization. The objective is to minimize the overall image discrepancies in all overlap regions while converting projective matrices into camera parameters such as focal length, aspect ratio, image center, 3D orientation and the like. Improved techniques for global optimization are disclosed that give order of magnitude improvements over prior systems of optimization. The third step re-projects all images onto a panorama by a method employing Laplacian-pyramid based blending using a Gaussian blend mask generated by the grassfire transform. The purpose of the blending is to provide a smooth transition between images and eliminate small residues of misalignments resulting from parallax or imperfect pairwise registrations. The invention further provides for human interaction, where necessary, for initialization, feedback and manual options.

Further, the present invention, unlike some of the prior art, allows for multiple views, from multiple planes and rows of images, and allows for the arbitrary orientation of photographic images to be constructed into a panorama, without specialized hardware such as a tripod or fisheye lens. In addition, the present system and method can be several orders of magnitude faster than the prior art.

The numerous aspects of the invention described herein result in a system for registration, calibration and blending that creates high quality panoramas from rectilinear images that is up to several orders of magnitude faster than prior systems. In one calculation, the present invention is up to 100,000 times faster than prior techniques. As a consequence, the present invention could be used to construct panoramas much quicker than previous methods. These panoramas can be used in applications where real-time image rendering is important, such as in real-time 3D virtual reality, the construction of background images, computer animation, multimedia, and the like.

The above described, and many other features and attendant advantages of the present invention will become apparent from a consideration of the following detailed description when considered in conjunction with the accompanying drawings.

BRIEF DESCRIPTION OF THE DRAWINGS

Detailed description of preferred embodiments of the invention will be made with reference to the accompanying drawings.

DETAILED DESCRIPTION OF THE PREFERRED EMBODIMENTS

Disclosed herein is a detailed description of the best presently known mode of carrying out the invention. This description is not to be taken in a limiting sense, but is made merely for the purpose of illustrating the general principles of the invention. The section titles and overall organization of the present detailed description are for the purpose of convenience only and are not intended to limit the present invention.

Figure 1A:
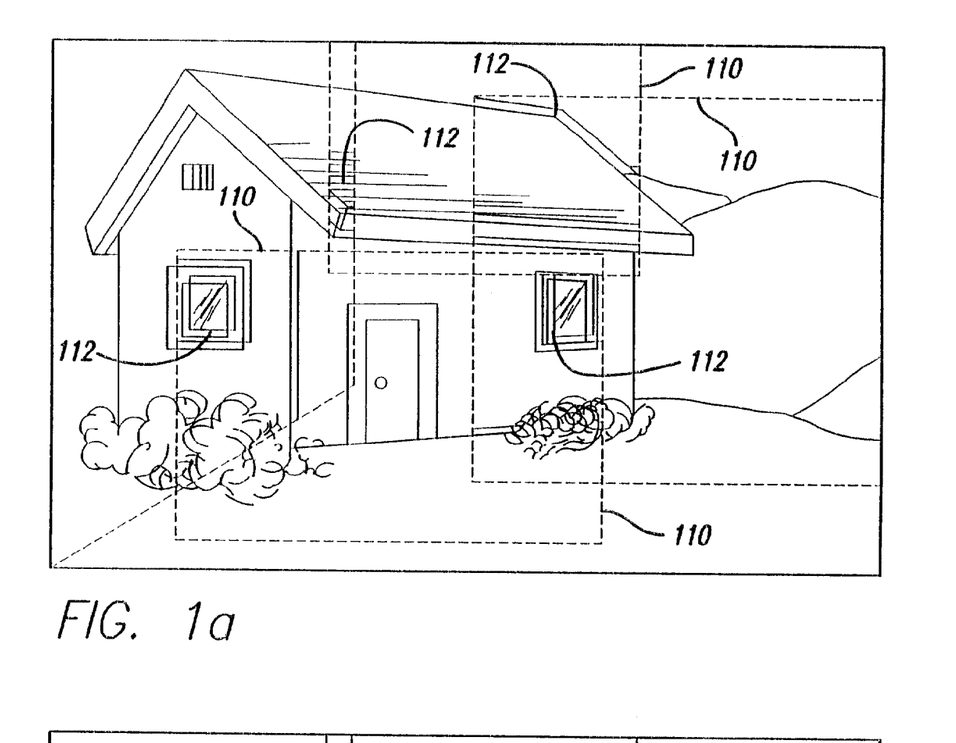
FIGS. 1(a) and 1(b) is an artist's rendition of a composite photograph before and after the application of the present invention.
Figure 1B:
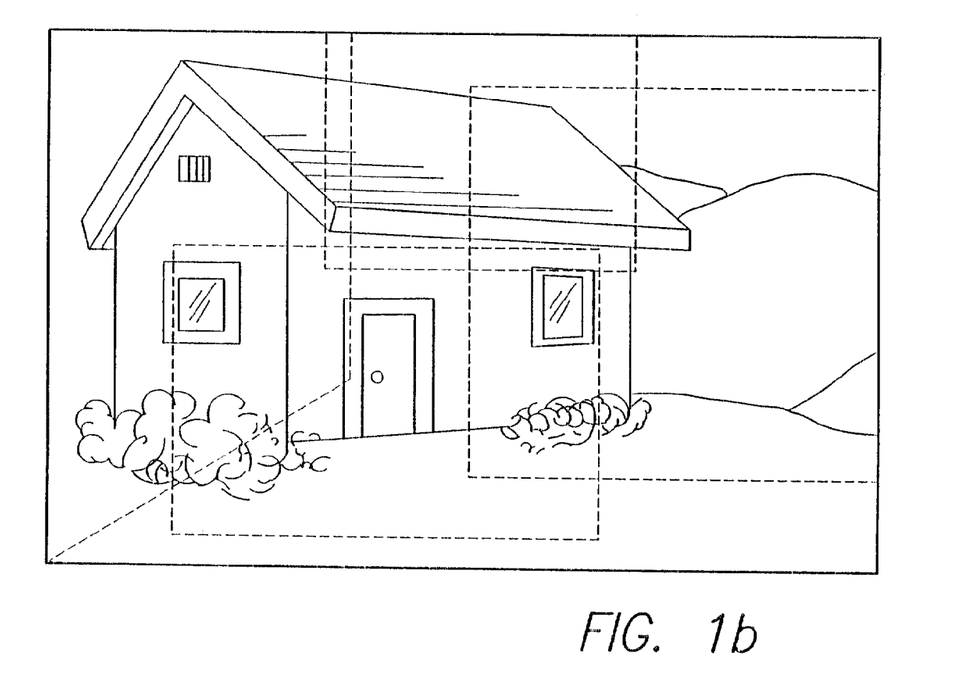

Turning to FIG. 1, there is shown a simulation of different overlapping rectilinear images, or 2D photographs, framed by dashed lines during the authoring portion of the present invention, as indicated by dashed lines 110. Where the images overlap there is potential for misalignment when constructing a 3D panorama, as indicated by blurry lines 112, for a variety of reasons, including the arbitrary position of the camera, errors in internal and external camera parameters, and, distortions that occur when warping a 2D image to construct a 3D image space. The present invention is designed to calibrate and align all such 2D rectilinear images with respect to one another and globally, blend the images where they overlap, and construct a reconstructed and relatively error free 3D panorama image, shown conceptually in 2D form as FIG. 1(b), for any arbitrary geometry.

Figures 2, 3:
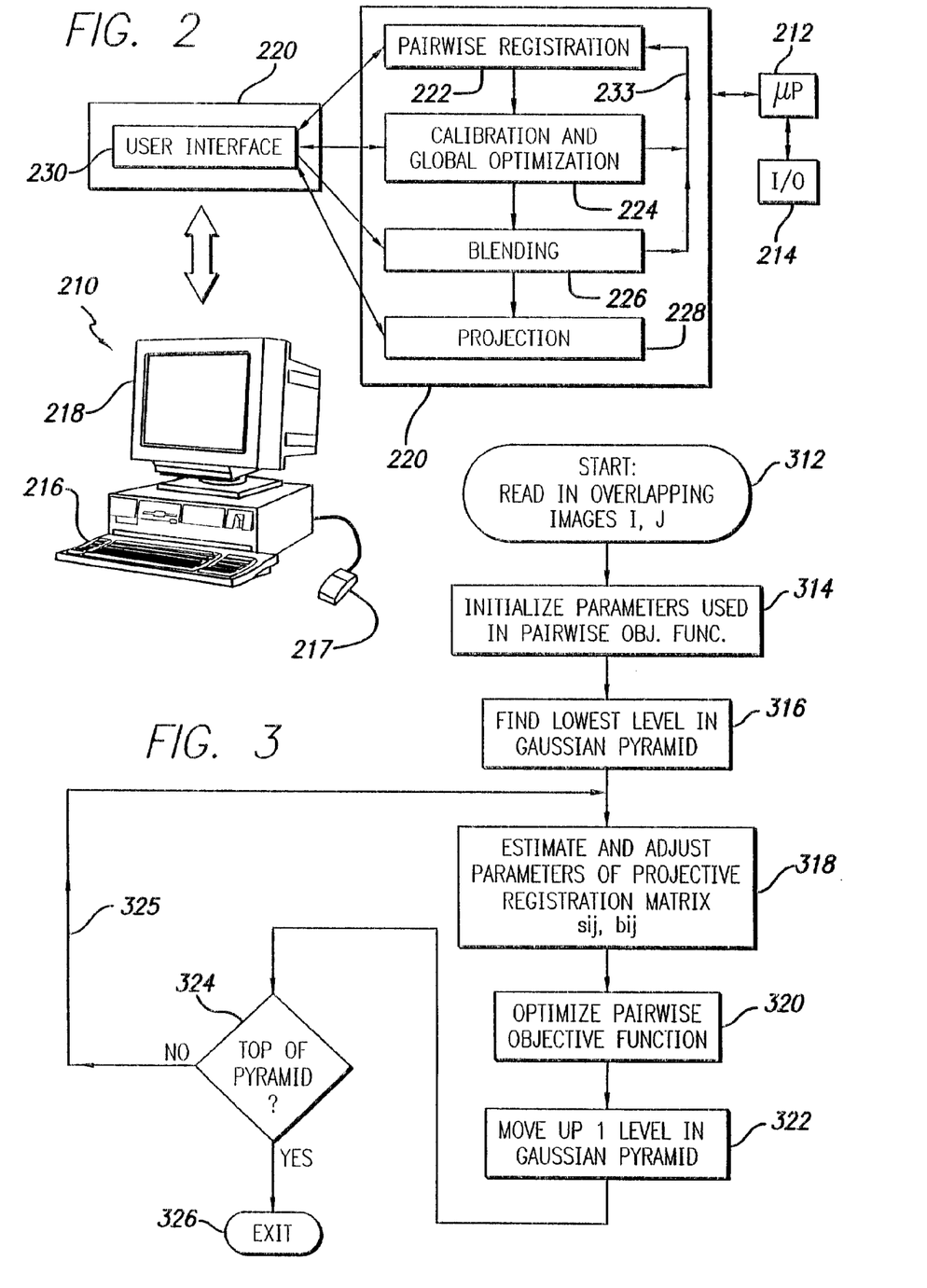
FIG. 2 is a generalized flowchart of the various function modules comprising one embodiment of the present invention.
FIG. 3 is a generalized flowchart of the method of operation of the Pairwise Registration function module of one embodiment of the present invention.

FIG. 2 discloses a generalized flowchart for overall operation of the invention. The invention is part of a system 210 comprising a computer, having all necessary hardware, such as processing unit 212, e.g., a G3 microprocessor chip; I/O 214, such as a keyboard 216, video monitor 218, and mouse 217; memory 220, which may be any sort of memory buffer, preferably primary memory, e.g. RAM, that can be cached to secondary memory, such as a hard drive. The system 210 is controlled by a program residing in system memory 220, which also stores output data and other data. The program is preferably written in the C or C++ language, using classes, structures, functions, calls, translation units, headers, subroutines, modules, and other features of structured programming, where appropriate, of both data and source code, suitably compiled and in executable form, in accordance with the teachings of the present disclosure to practice the invention. The present invention is also suitable for implementation with an interpreted language such as Java.

In constructing a panorama from rectilinear images, the system finds solutions to three sub-problems: (1) the projective registrations of overlapping images (shown as the "local pairwise registration" box 222 in FIG. 2), (2) calibration and global optimization of these images, a self-calibration in which 2D image planes are positioned as 3D planes in space (shown as the "calibration and global optimization" box 224 in FIG. 2), and (3) the composing or blending problem in which images are ready to be reprojected to a 3D environment map with pixels in overlap regions being composed from multiple images, to smooth any transitional discontinuities (shown as the "blending" box 226 in FIG. 2). Finally, there is the projection or construction of the assembled panorama onto a 3D geometry surface, such as a cylinder, cube or sphere (defined as the "projection" box 228 in FIG. 2).

The solutions to these sub-problems are performed by software function modules 222, 224, 226, 228 residing in memory 220 and operating the processor 212. The modules are designated, as explained further herein, the pairwise registration function module 222, the calibration and global optimization function module 224, the blending function module 226, and the projection function module 228. A user interface module 230, also residing in memory 220, may interact with the other modules to pass data to and from the modules, and accept input from a human user of the system. The modules may receive data from memory, manipulate that data as described herein, and output the data to other modules. The three modules 222, 224 and 226 may perform feedback to pass data back to previous modules, as indicated by arrows 233, and as described below. Although in a preferred embodiment the modules are programmed as separate software routines or classes, the modules may be combined into one module performing all the designated tasks performed by separate modules.

As a final step, the fourth module, the projection function module 228, constructs a panoramic scene by projecting the blended image onto any designated geometry view surface, typically a cubic, polyhedral, cylindrical or spherical surface. The projection module may be controlled through the user interface 230 as well, to allow a user to select what geometry will be projected onto and to control and modify other factors, including the use of photo re-touching software such as PhotoShop™ for modifying the final panorama.

Generally, the local registration, self-calibration and global optimization, and blending involve a multi-step procedure.

First, regarding the initial local registration, and referring generally to the generalized flowchart of FIG. 3, the system 210 reads in each overlapping rectilinear image into main memory 220, as indicated by step 312. The images are assumed to roughly share a common nodal point (i.e., that point in the three-space where all rays of light converge through a lens) with other overlapping rectilinear images. The object of the program during local registration is to register the locally overlapping images, by comparing common overlapping areas between overlapping images at certain predetermined resolution levels on a Gaussian pyramid representing the overlapped images. Different combinations of overlapping areas are tried to achieve the optimal overlap between images (or, equivalently, the smallest error in the error function or pairwise objective function described herein) using the steps described herein, which generally minimizes the average squared pixel intensity (e.g., brightness and contrast) difference with respect to certain transformation parameters. Initial values for parameters used in optimizing the pairwise objective function are assumed by the computer, as indicated in step 314. The initial values may optionally be input by a user, e.g., with a user interface 230 as in FIG. 2, and in response to a user dialog window such as of the kind shown in FIG. 6. Besides the global orientation (pan, tilt and roll) the other parameters that are most likely to give instability in convergence of the error function are bad initial estimates of the brightness and contrast, as well as of the geometric image center of projection of the overlapping rectilinear images. Certain parameters most likely to create instability in the convergence of the local error functions can be controlled (e.g., progressively dampened at different levels of the Gaussian pyramid) to ensure convergence, as indicated by step 318. The overlapping images are then perturbed and the local error function with respect to these and other variables is calculated until a minimal local error function is found, as indicated by step 320. The minimal local error function is then stored for a particular level of the Gaussian pyramid, as indicated in step 322, for each pairwise registration, and is saved and later used to compute a global error function for all the overlapping images. The local pairwise registration module 222 iterates until the entire Gaussian pyramid is traversed, starting from the coarsest level of the pyramid (sometimes called the bottom, where the pyramid can be standing on its inverted top) and working to the finest level resolution, as indicated in decision box 324. It should be noted that at any stage throughout the registration, and throughout the invention in general, the system may check for a user interruption, through the user interface, that would require immediate attention from the processor, such as to allow the user to interactively adjust the parameters to avoid divergence or convergence to an undesired local minimum.

As indicated in box 316 of FIG. 3, it must be determined at what level in the Gaussian pyramid to start the local pairwise registration. One way to find the lowest level is to select the resolution level at which it is found that the images share at least some arbitrary number of overlapping pixels, e.g., preferably about 30 pixels from each side, e.g., preferably no less than 30 pixels across the overlapping area. If greater than 60 pixels of overlap is found in these areas, the size (resolution) of the overlap region is decreased by half (going deeper into the pyramid) and the procedure of the present invention is reiterated again. If, on the other hand, the overlap is less than 30 pixels, then the size (resolution) of the overlap region is increased by doubling. By utilizing multi-resolution registration of overlapping images by way of the Gaussian pyramid, convergence to the desired optimum is accelerated, and false local minima are avoided.

On occasion, it may be visually apparent to a user that during registration the images are not converging optimally. In this case user input may manually abort the pairwise registration procedure, and the user may manually help align the images closer before resuming automatic registration, as before. This manual intervention is true for all aspects of the invention. Nevertheless, the present invention is surprisingly robust, and manual intervention is not a prerequisite for the invention to work.

Non-optimal convergence or divergence has sometimes been found to be the case whenever images for a spherical projection are used, especially those in the "pole" regions of the sphere (though in general the invention can adjust quite nicely for images that wrap around the poles). Divergence sometimes results when the initial default parameters chosen are wildly off or not suitable for convergence. During such instability, the images will appear to a user to "run away" from each other. In this case, and throughout the invention, provision may be provided in the user interface 230 of the embodiment of FIG. 2 of the present invention for manual intervention, such as to abort the program, for the manual selection and relative positioning of the images to be pairwise registered, and for the selection and relative positioning of overlapping images for blending.

The iterative method of moving down a pyramid when an overlap region is greater than, say, 30 pixels, is an attempt to prevent instability in the error function due to problematic parameters, such as initial value errors in the image center of projection of the images being registered, and errors in setting initial brightness and contrast values. Techniques of damping and annealing of problematic parameters (with damping progressively diminished and finally set to zero as one moves up the pyramid to finer levels) can be used to stabilize the local error function for these problematic terms, as explained further herein.

One improvement over prior techniques has been to save the local error function values and use them to compute and optimize the global error function needed for optimization. This improvement also avoids having to evaluate the entire global error function (global objective function) from scratch. The pairwise objective functions (local error functions) are approximated by a quadratic Taylor series, and, together with the chain rule, the global objective function (global error function) is minimized. Calculation of the global error function is greatly speeded up by this procedure.

Figure 7:
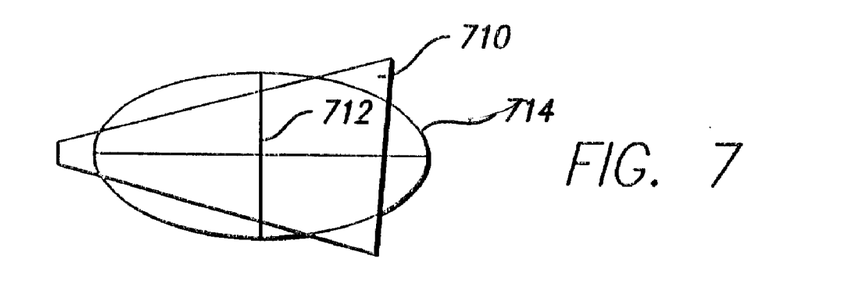
FIG. 7 is a conceptual illustration on the problem of finding the proper Laplacian pyramid level using the minor axis of an inertial ellipse.

Further regarding rectilinear images taken in a non-arbitrary manner (such as from a tripod that is rotated, or a photographer who manually "pans" a field of view), the number of pyramid levels and optimal direction for the blending of images overlapping in a region can be computed by the present invention by computing the minimum eigenvalue of the 2×2 inertial tensor of the overlapping region between two images. It has been found in practice that for an arbitrary polygon representing an overlapping region, the optimal direction for blending, as well as the width of the blending region (which determines the level in the pyramid at which to start the method of registration and optimization) is found along the minor axis of the inertial ellipse found from solving for the inertial tensor of the overlapping images. A similar method of finding the proper pyramid level is by solving for the smallest eigenvalue of an inertial tensor of the overlap region between images. Conceptually, such an ellipse is shown in FIG. 7. The blending region in an arbitrarily shaped polygon region 710, which represents the area of overlap between overlapping images, lies along the width and direction of the minor axis 712 of the ellipse 714, which is calculated from the inertial tensor of the overlapping images forming the polygon.

Thus, the results from computing the inertial tensor are used to determine the pyramid level, blending width, and blending direction. The smallest inertial eigenvalue is used to determine the number of pyramid levels. One could also use the eigenvalue vector (eigenvector) to determine the direction, or, preferably, use a blending mask, as explained herein, that yields a grayscale ramp, which defines direction in a direction field from taking the grayscale ramp gradient.

Next, after pairwise local registration, global optimization is used to remove any inconsistencies. The parameters found at the local registration level, generally from six to ten parameters per overlapping image pair, are optimized globally. Various constraints ensure optimization whenever there are suitable overlapping image pairs, as the number of independent parameters is usually less than the constraints. Regarding optimization in general, to ensure the best chance for convergence of a solution a combination of simulated annealing and progressive damping is used, as described herein.

Global optimization is necessary because noise in the images will yield inconsistencies in cyclically overlapping sets of images (e.g., that A is pairwise registered with B, B with C, and C with A, does not necessarily mean A and C are properly globally registered with C and B). During the global optimization phase, the discrepancies are distributed among all image pairs in such a way as to minimize the increase in total error. The Hessian matrix, computed in the local registration phase, as described further herein, provides a description of the shape of the error function landscape in the neighborhood of each pairwise optimum. Parametric perturbations occur along the valleys of this landscape (as indicated by the Hessian), where the increase in error is minimal. One way of looking at this solution is to say that knowledge gathered from the pairwise registration optimization is saved and used for global optimization, avoiding additional computation.

Figure 4:
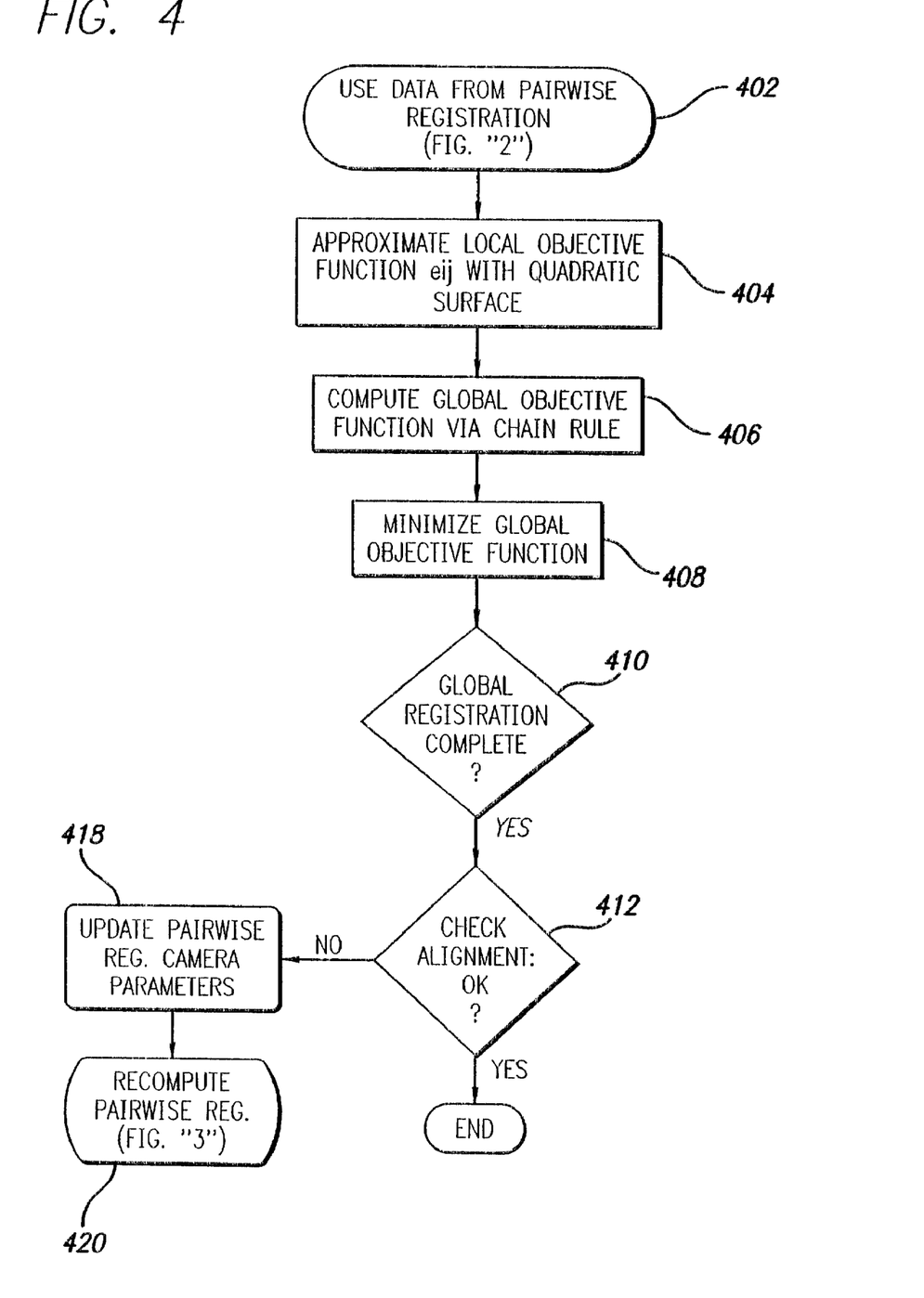
FIG. 4 is a generalized flowchart for the method of operation of the Calibration and Global Optimization function module of one embodiment of the present invention.

Turning attention to FIG. 4, there is shown a generalized flowchart for the calibration and global optimization module of the present invention. Data from the local pairwise registration module 222 is provided to the calibration and global optimization module 224, as indicated by box step 402. Such data can include the pairwise objective functions (local error function values) for each pairwise registration found previously. The global objective function is calculated from such data, as indicated by boxes 404, 406, and as described more fully below. The alignment of images globally is checked to ensure global registration, as in decision boxes 410 and 412, which may accept manual input from a user, via a user interface module. If there is alignment, the system proceeds from the calibration and global optimization function module to the blending of images. Otherwise, as illustrated by boxes 418 and 420, the pairwise registration module parameters (such as shown by box 314 in FIG. 3) may be re-initialized and the pairwise registration module reexecuted to recompute the pairwise registration of images, using better, updated camera parameters as determined from the global registration procedure as shown in FIG. 4.

During the blending step of the procedure utilized by the system of the present invention, the image overlap regions are "blended" or the images are "stitched" together, so that the high frequencies (e.g., sharp lines of contrast, such as edge boundaries, analogous to the high frequency signals associated with a square wave) are blended over a narrow blend region range, and the low frequencies (e.g., illumination variations, analogous to DC baseband signals) are blended over a wide range. In this way the images are seamlessly integrated to form a panorama in an aesthetic manner.

Figure 5:
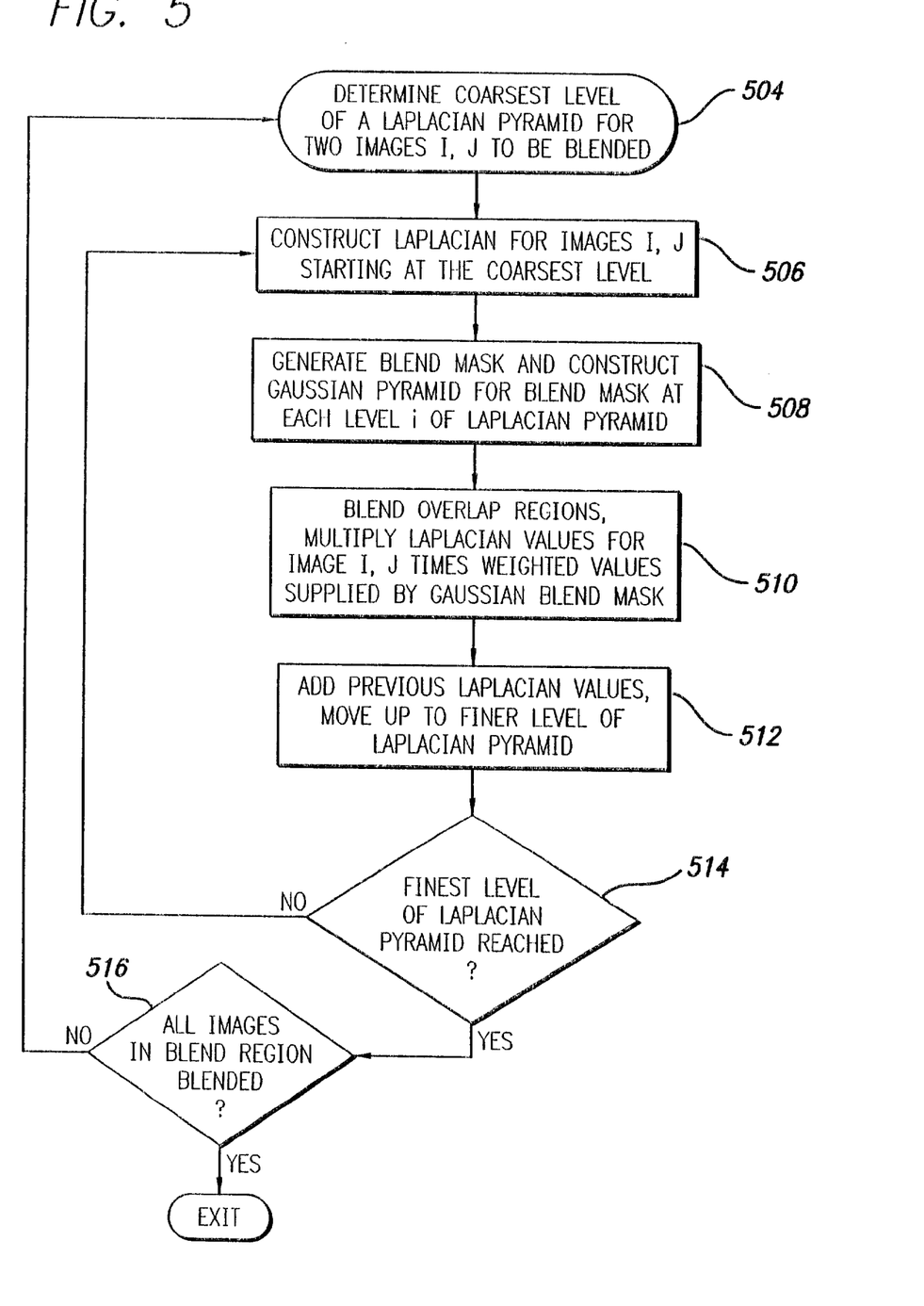
FIG. 5 is a generalized flowchart for the method of operation of the blending function module of one embodiment of the present invention.

In one preferred embodiment of the invention, as illustrated by the steps in FIG. 5, blending is performed by determining the coarsest level in a Laplacian pyramid for which to begin blending of images I, J (box 504), and constructing a Laplacian pyramid at this level (box 506). One of the two images may be comprised of previously blended images. A blend mask boundary is generated (box 508), defining the boundary over which blending is to occur, preferably using the "grassfire" transform method. Next, a blend mask is generated by a Gaussian pyramid method (box 508). In one preferred embodiment, the overlapping images I and J that are to be blended are put into a Laplacian pyramid and multiplied by the blending mask, or its compliment, respectively (box 510). The resulting product is repeatedly added together to each level of the Laplacian pyramid (box 512), moving up to the finest level resolution of the pyramid in a sequential fashion (decision box 514), until a blended image is achieved for the two images. A similar procedure is performed for all other images that overlap, as indicated by decision box 516. This preferred technique has the advantage over prior techniques in that low frequency component images are blended over a wider area region, giving a smoothing effect, as desired for low frequency components, while high frequency components (such as sharp edges) are blended over a smaller blend region, giving a "sharpening" effect for these high frequency components, exactly as desired. This is illustrated conceptually by FIG. 8.

Authoring a panorama from 2D images can be thought of as divided into two different phases: (1) orientation of originally 2D images into 3D space, and (2) the projection of a panorama onto a particular 3D geometry, that can later be used to project views of the panorama onto a 2D viewing plane. A series of preferably overlapping photographs are analyzed to determine what orientation the photographs were taken in order to establish a common ground for subsequent operations, including the construction of a panorama. The panorama is not ordinarily meant to be viewed by a user, only the subsequent projection of the panorama onto a viewing plane is viewed by the user. The panorama is constructed on a particular geometry that will best facilitate the subsequent step (sometimes termed rendering) of the projection of the panorama from the particular geometry onto a chosen viewing plane for viewing by a user. Typical geometries in the system of the present invention on which panaoramas are formed include: cubic, polyhedral, cylindrical and spherical geometries. However, any type of geometry may be used, such as two frusto-conical cones joined at their base with the apexes pointing away from one another; any quadric surface, and any and all of the geometries that employ the following projections: equidistant, equiangular, ellipsoid, Mercator (and all derivatives thereof, e.g., transverse Mercator, Oblique Mercator, and the like), cylindrical equal-area, Miller cylindrical, equidistant cylindrical, Cassini (e.g., both for spherical and ellipsoid projections, and the like), all conic map projections, e.g., Albers equal-area, Lambert conformal conic, equidistant conic, bipolar oblique conic conformal, polyconic, Bonne, all azimuthal and related projections, e.g., orthographic, sterographic, gnomonic, general perspective, Lambert azimuthal equal-area, azimuthal equidistant, modified-stereographic conformal, all space map projections, including space oblique Mercator and satellite-tracking projections, all pseudocylindrical and other miscellaneous projections, including Van der Grinten, sinusoidal, Mollweide and Eckert IV and VI projections. The foregoing list is meant to be illustrative and not exhaustive of the geometries and projections possible during the construction and employment of panoramas using the system of the present invention.

Further, the present invention can be employed in future systems that are fast enough to eliminate the need for a projection function module 228, and proceed directly from pairwise registration, calibration and global optimization to the viewing and blending of the panorama on a chosen viewing plane, without loss of generality. Presently, however, there is not sufficient computing power in most desktop computers for this to be feasible for real time applications.

Furthermore, the system of the present invention has means for a user interface for all phases of the invention. A user may select, among other things, which images are to be registered, and at what arbitrary image plane. The user interface, suitable for display on a computer monitor and with input from a keyboard, mouse pointer, or other I/O device, has fields for any and all internal and external parameters of the projection matrix of the images, including aspect ratio, number of rows of images, the tilt between rows, the angle between photos within a row, the roll of each image taken (e.g., landscape mode), as well as fields for how many horizontal rows of images are to be registered (typically two or more), image center position, focal length of camera, camera orientation with respect to a common reference frame, such as camera pan, tilt, roll and skew, and the brightness and contrast of images. The user interface may have the ability to adjust the aforementioned parameters for each image individually, or may have the ability to adjust parameters for images captured with a particular methodology, such as equal angular increments in latitude and longitude.

Figure 6:
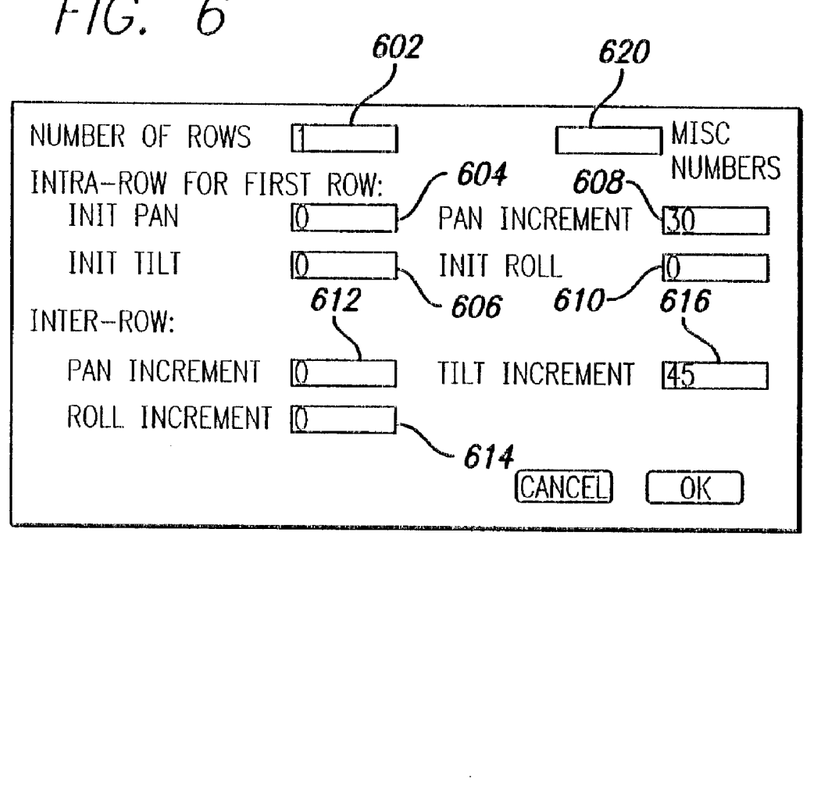
FIG. 6 is a screen shot of a user interface dialog window for the user interface of one embodiment of the present invention.

Thus, turning attention now to FIG. 6, there is shown a screen shot of a user interface for the present system, suitable for initialization parameters for an ensemble of images, captured with an equal angular increment methodology that can be facilitated by use of a tripod. The user interface is particularly useful for authoring panoramas when a user wishes to adjust the automatic default orientation generated by the computer for the present invention. A more complex user interface may be provided to accommodate the initial orientation and placement of a free-form set of images, i.e. a set of images captured without any particular methodology, such as that captured using a hand-held camera. A plurality of parameters of the kind described herein may be manually entered into the dialog box fields by the user (if known) to aid in the pairwise registration, calibration and global optimization and blending of images. Further, the particular images selected for pairwise registration and calibration and global optimization may be aborted during non-convergence run-away conditions. Some of the parameters that may be explicitly specified by a user include (referring to FIG. 6) the number of rows 602 (assuming a panning of photos are taken, with a number of overlapping rows of photos taken about a 360 degree arc), initial pan 604, initial tilt 606, pan increment 608 and initial roll 610 for the first row of photos (rows are preferably used, but vertical columns of photos are also contemplated); and, for inter-row parameters, the pan increment 612, roll increment 614 and tilt increment 616. Zoom lens distortion factors and other miscellaneous factors may be entered in dialog fields such as field 620. Other parameters may be specified for overriding the computer defaults and for better guaranteeing convergence, such as camera focal length or f-stop, pixel aspect ratio, and the like. In addition, the user interface may allow for the selection, arrangement and relative positioning of photos to be composed into a panorama, preferably in a row by row layout, with preferably at least one or more rows of photos to be made into the panorama.

Further, while one preferred embodiment of the present system is designed for overlapping image pairs to share a common nodal position, in general the system is forgiving of nodal point changes, provided the changes are not excessive, e.g., a 1% shift in nodal point should still allow satisfactory panoramas to be formed. The one-percent shift is not overly cumbersome when taking long range photos, e.g., from the height of the 300 m Eiffel Tower a 1% shift will allow up to 3 meters (nearly 10 ft) of shifting of camera nodal position when taking photos at the base, which can accommodate an amateur photographer taking pictures without a tripod.

Turning attention again to the three modules labeled Pairwise Registration, Calibration and Global Optimization and Blending, as illustrated in FIG. 2, the authoring aspect of the invention will be further described.

I. Pairwise Registration

To find a solution to the first sub-problem posed in constructing a panorama from rectilinear images, finding the projective registrations of overlapping images, one must pairwise register the two images. Pairwise registration can be thought of as synonymous to finding an estimate of the projective transformation relating two given overlapping rectilinear images. The projective transformation may be represented by a particular parametrized projective matrix, that is parametrized by a typical canonical number (usually 8 or 9) projective parameters, e.g., 3D rotation parameters (pan, tilt roll), center of projection of images, ratio of focal lengths, and the like. The projective matrix can be defined as a particular case of a three-dimensional affine transformation, a transformation that effects rotation, scaling, shear and translation, with the restriction that camera motions are rotational. As is known per se, transformations are important tools in generating three-dimensional scenes, in moving objects around in an environment, and in constructing a two-dimensional view of the environment.

The mathematics described herein are but one representation for the method carried out by the apparatus of the present system for one or more preferred embodiments of the invention. In mathematics the same phenomena can be represented in different symbolic notation—which often appear to the untrained eye as being radically different from one another—without changing the nature of the phenomena described. For example, as explained above and represented further below, the projective transformation of a pair of images can be more particularly characterized as a projective transformation that is particularized as a projective matrix parametrized by a certain projective matrix parameters (typically having 8 or 9 projective parameters, as explained herein, such as pan, tilt, roll, center of projection of the images, ratio of focal lengths, and the like). However, this particular representation does not preclude the projective transformation from being reduced to practice using the teachings of the present invention by alternate equivalent methods or other representations, other than as represented by a particular parametric matrix representation, without loss of generality from the way the invention is described herein. Further, and concomitantly, the transformations involved with the present invention may be described in alternate notation, using for example Euler angles or quaternions, without detracting from the spirit and scope of the invention. It is to be understood from the teachings of the present disclosure that the description of a projective matrix also includes these other representations. By the same token, programming constructs such as data structures and classes are typically realized in binary code, rather than abstract mathematical notations, and, as such, constitute the machine readable representations of the constructs. The representation of such constructs in this form do not result in any loss of generality of the representation of the underlying invention as described herein.

Regarding local pairwise registration in general, if one restricts camera motions to be rotational only, the 2D warping between images i, j, is strictly projective in absence of lens distortions, and given by, [Eq. (1)]

$$\begin{bmatrix} x_i \\ y_i \\ z_i \end{bmatrix} = \begin{bmatrix} m_0 & m_1 & m_2 \\ m_3 & m_4 & m_5 \\ m_6 & m_7 & m_8 \end{bmatrix} \begin{bmatrix} x_j \\ y_j \\ z_j \end{bmatrix} \quad (1)$$

where: $[x_i\ y_i\ z_i]^T$ are the homogeneous coordinates of pixel locations (with the convention that column vectors represent three-dimensional points). In the following description, the vector $X_i$ represents the homogeneous coordinates, and the matrix $M_{ij}$ represents the matrix that transforms coordinates from image j to image i. Due to the scale ambiguity in the projective matrix, the last parameter $m_8$ in the projective matrices is set to equal 1.

The objective of local pairwise registration is to estimate the projective matrix given two overlapping images. The projective matrix is initialized by the camera internal and external parameters, e.g., [Eq. (2)]

$$M_{ij} = T^{-1}(p_i, q_i) T(p_j, q_j) \quad (2)$$

[Eq. (3)]
where $$T(p_i, q_i) = R(q_i) \begin{bmatrix} 1 & 0 & -C_x^i \\ 0 & A_I & -C_y^i \\ 0 & 0 & f_i \end{bmatrix} \quad (3)$$

where $[C_x^i, C_y^i], a_i, f_i$ are the image center position, the aspect ratio and the focal length, respectively;

$$p_i = [a_i, f_i, C_x^i, C_y^i]^T$$

is the internal parameters vector;

$q_i$=represents the camera orientation with respect to a common reference frame; and $R(\ )$=represents the 3×3 rotation matrix computed from the orientation parameters $q_i$.

Camera internal and external parameters are initialized either automatically by the computer assuming default values, or manually with user input.

There are ten parameters in the projective registration: eight independent parameters in the projective matrix and two parameters to compensate for brightness and contrast difference between the two images. The gradient-based optimization minimizes the following objective, as suggested in box 320 in FIG. 3, by instructing the processor 212 to perturb the overlapping images stored in memory with various combinations of overlapping pixels until the below local registration error function has the smallest value [Eq. 4]:

$$e_{ij} = \frac{1}{A_{ij}} \sum_{overlap} (s_{ij} I_j(X_j) + b_{ij} - I_i(M_{ij} X_j))^2 \quad (4)$$

where $s_{ij}$ and $b_{ij}$, the exposure parameters, represent the exposure difference, $I_i(\ )$ and $I_j(\ )$ are pixel intensity values from the two images, and $A_{ij}$ is the overlap area (which helps normalize the error function $e_{ij}$). The optimizations are performed on progressively finer levels of Gaussian pyramids. In practice, however, it has been found that the direct application of gradient-based optimization frequently failed due to exposure differences, large translations, or both. Therefore, preferably a combination of correlation-based linear search and a progressive damping (e.g., simulated annealing) of exposure parameters is used to alleviate the problem, as suggested by box 318 of FIG. 3. On the coarsest pyramid level (e.g., 'lowest' resolution level of the image, the method of the invention first performs a linear search over the transitional parameters using normalized correlations, an idea similar to a progressive complexity search known per se ink the art, e.g., see H. Sawhney and R. Kumar, "True multi-image alignment and its application to mosaicing and lens distortion correction", Proc. of CVPR, pp. 450–56 (1997). Since the image size on the coarsest pyramid level is small, the correlations are done efficiently. Once the maximal correlations are found, the exposure parameters $s_{ij}$ and $b_{ij}$ are estimated through a linear regression. When the gradient-based optimization is performed on subsequent finer pyramid levels, the damping coefficients on exposure parameters are reduced exponentially, and finally set to zero at the finest pyramid level.

To determine the number of pyramid levels given an arbitrary overlap of two images, one can compute the eigenvalues of the 2×2 inertial tensor of the overlap polygon region. Determining eigenvalues and inertial tensors are known in the art per se. The square root "I" of the smaller eigenvalue is used to estimate the number of pyramid levels according to the formula:

$$\log_2\left(\frac{I}{I_{min}}\right) \quad (5)$$

where $I_{min}$ is the minimal size of the finest level resolution pyramid level. In a preferred embodiment, $I_{min}$ is set to 10 pixels.

II. Calibration and Global Optimization

The second major step in authoring panoramas is to extract camera internal and external parameters from those projective matrices estimated in step I. above. In general, it is impossible to achieve a direct solution by inverting Eq. (2) above directly to obtain the camera parameters, since there are eleven camera parameters while a projective matrix provides only eight constraints. However, because one image usually overlaps with multiple images, one can take advantage of redundancy in the system to obtain a consistent set of camera parameters that approximates all projective matrices in the same time. A global optimization routine module is used to achieve this goal.

Since the projective matrix is a function of camera parameters as in Eq. (2), to extract all camera internal and external parameters the following objective functions are minimized by having the calibration and global optimization module 224 of FIG. 2 instruct the processor to perturb different combinations of images stored in memory to minimize the following global error function: [Eq. (6)]

$$E = \sum_{ij} A_{ij} e_{ij}(M_{ij}(p_i, q_i, p_j, q_j)) \quad (6)$$

where $e_{ij}$ is the pairwise objective function in Eq. (4).

However, it has been, found that it is computationally prohibitively expensive to evaluate the objective functions according to Eq. (6). By noting that the pairwise objective function $e_{ij}$ has already been optimized individually, we can approximate it by a quadratic surface, which can be viewed as terms from a matrix Taylor Series expansion. Thus, in a preferred embodiment, the following approximation is used in the calibration and global optimization routine module: [Eq. (7)]

$$e_{ij}(M_{ij}) \approx e_{ij}^0 + (M_{ij} - M_{ij}^0)^T C_{ij}(M_{ij} - M_{ij}^0) \quad (7)$$

where
- $e_{ij}^0$ is a constant representing the minimal value achieved in the pairwise registration; $M_{ij}^0$ is the 8×1 vector representing the optimal projective matrix, and
- $C_{ij}$ is the 8×8 Hessian matrix obtained when optimizing objective function $e_{ij}$, as in the methods of Levenberg-Marquardt or Broyden-Fletcher-Goldfarb-Shanno, known in the art per se. Thus the projective matrix can be treated as an 8×1 vector instead of a 3×3 matrix. This step is represented in FIG. 4 as box 404. Other methods may be employed in the present invention using the teachings herein without departing from the scope of the invention.

Next, once the pairwise objective functions are approximated by quadratic surfaces with Eq. (7), the global objective function in Eq. (6) is used as a weighted sum of all those quadratic surfaces thus computed in the global optimization routine module. The global objective function has a gradient with respect to the camera internal and external parameters that can be easily established thorough the chain rule: [Eq. (8)]

$$\frac{\partial E}{\partial(p_i, q_i)} = \sum_j \frac{\partial e_{ij}}{\partial M_{ij}} \frac{\partial M_{ij}}{\partial(p_i, q_i)} \quad (8)$$

from using Eq. (2) and Eq. (7) above, as shown in FIG. 4 as box 406. It has been found that since no direct evaluation on images is involved, the computation required using Eq. (7)–(8) as described above in minimizing the global objective function for all the overlapping images is nearly trivial. The computational savings using the techniques described herein result in several orders of magnitude in savings of time and speed over prior techniques of optimization.

In the most general case, the camera parameters for each image are four internal parameters, $p_i$, and three orientation parameters qi. Every pairwise registration provides eight constraints on those camera parameters. When there are plenty of overlapping images pairs, the optimization is overconstrained, in that the number of independent parameters is generally less than that of the number of constraints. However, in practice, even when the optimization appears to be overconstrained, oftentimes camera parameters are so weakly constrained that they can easily diverge the whole optimization.

In order to solve the aforementioned problem, so that the optimization described herein behaves well in underconstrained or weakly constrained situations, it is preferred that simulated annealing be used to dampen the camera internal parameters. Conceptually this step is shown in the generalized flowchart of FIG. 4 as box 408. As the optimization progresses, the damping parameters are gradually reduced. The exposure parameters $s_{ij}$ and $b_{ij}$ are estimated through a linear regression. The proposed solution has been found to work remarkably well in practice, and is a significant improvement over prior techniques.

The pairwise registration and global optimization described above can be iterated if the alignments are still not satisfactory, by either by a user acting through the user interface, or by automated means, as indicated by arrows 233 in FIG. 2 and boxes 418 and 420 in FIG. 4. Thus, in the iteration, the pairwise registration module 222 will use the improved camera parameters generated by the calibration and global optimization module 224 to re-initialize the projective registrations, and re-compute the optimal projective matrices and their Hessians. Then the improved projective matrix parameters will, in turn, be used to generate improved estimations of camera parameters in the global optimization module 224. Likewise, blending may be further iterated after registering, calibrating and optimizing the images after an initial blending.

III. Blending

Figure 9:
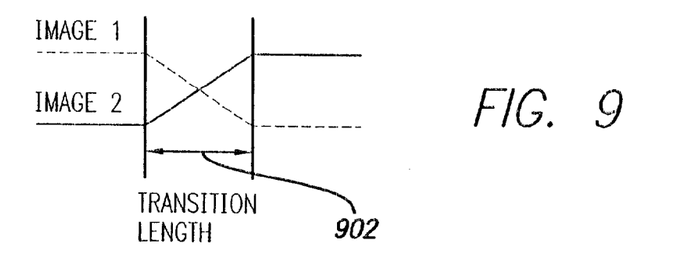
FIG. 9 conceptually illustrates the weighted average method for blending.

Notwithstanding the improved method and system of pairwise registration, camera calibration and global optimization of images described above, it has been found that for high quality panoramas blending of overlapping image boundaries is often required prior to viewing the panorama. Such blending is required when the pairwise registration and global optimization by the system generates panoramas having imperfectly aligned images that give "shadow" or "ghosting" effects, if the images are averaged in overlap regions. As human eyes are very sensitive to such imperfections, in one preferred embodiment human input may be used to facilitate proper blending during the authoring of a panorama, using the system and method disclosed herein. Other methods for blending may also be employed in the present invention, such as the multi-resolution weighted average method, and the weighted average method. In the weighted average method, as illustrated in FIG. 9, there is a transition region 902 between images to be blended, Image 1 and Image 2. The weights of image 1 for intensity or other parameter is linearly decreased from a value of 1.0 to 0.0 in the transition region, while the weights of Image 2 is increased from 0.0 to 1.0. A pixel in the transition area is a weighted sum of two pixels from two images.

Figure 8:
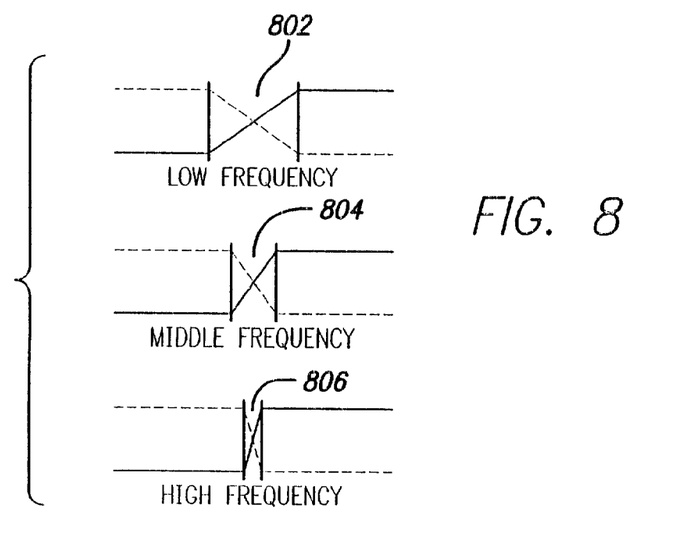
FIG. 8 is a graphical illustration of the transition lengths for different frequency image components (low, middle and high) used in one embodiment of the blending function module of the present invention.

By contrast, the multi-resolution weighted average method first decomposes two images into different frequency bands by building Laplacian pyramids, and performs separate weighted averages on each pyramid level with different transition lengths for each frequency. Transition lengths are defined by the region it takes for a parameter to go from value 1 to 0 or 0 to 1. FIG. 8 shows the transition lengths for different frequency bands (low, middle and high) of images, with high frequency image components having a shorter transition length region than low frequency image components. The result of this multi-resolution blending method is seamless and absent of shadow effects. Multi-resolution weighted average blending, known per se in the art, is further described in P. Burt and E. Adelson, "A multiresolution spline with application to image mosaics", ACM Transactions on Graphics, 2(4):217–236 (1983). While multi-resolution blending described herein is the preferred blending technique in a preferred embodiment of the invention, other types of blending, including simple weighted average blending, is within the scope of the invention.

Figure 10A:
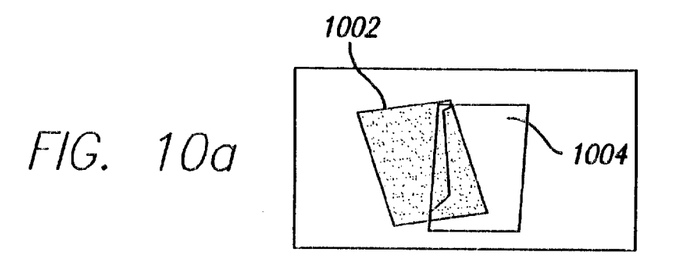
FIGS. 10(a) and (b) illustrate the blend mask used for blending two images during the blending phase of one embodiment of the present invention.
Figure 10B:
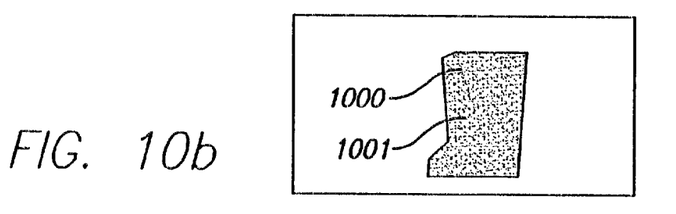

To determine the boundary of overlap regions to perform multi-resolution blending, preferably a blend mask is needed for an arbitrarily shaped transition region. The Gaussian pyramid of the mask image supplies the weights for every pixel at every pyramid level. FIGS. 10(a) and (b) illustrate the blend mask 1000 used for the panoramic canvas having two overlapping images, Image 1002 (Image 1) and 1004 (Image 2). In order to maximize the size of the transition region for blending, the boundary curve of the mask inside the overlap regions, boundary 1001, needs to be as far way as possible from the original image boundaries. To locate the mask boundary a grassfire transform is preferably used on two images individually. The resulting distance maps represent how far away each pixel is from its nearest boundary. The pixel values of the blend mask is then set to either 0 or 1 by comparing the distance values at each pixel in the two distance maps.

Generally, the grassfire transform measures distance by noting the time it takes for a constant velocity wave front to reach a certain point, knowing that distance equals velocity multiplied by time. Conceptually, the distance is measured as if distance were measured by noting the time elapsed that a grass fire, having constant velocity and lit on the edges of a grass field, progresses to the center of the field. In this way the exact boundaries of the field do not have to be surveyed by more precise techniques of geometry. Further details regarding the grassfire transform, known per se in the art, can be found in the literature, e.g., C. Arcelli, L. P. Cordella, and S. Levialdi, "A grassfire transformation for binary digital pictures.", ICPR74, pp. 152–54 (1974). However, though the grassfire transform is preferred in one embodiment of the present invention, other techniques may be used to generate a blend mask, such as solving directly a Laplacian differential equation with predetermined boundary conditions to directly generate a mask with the addition of a gray scale.

Regarding the blending procedure, the blending is achieved by the following method. An empty panoramic canvas, which can simply be a buffer of memory in a computer system, such as memory 220 in FIG. 2, is copied with the first image, Image 1. Second, new images are blended onto the panoramic canvas one by one. For each of those new images, the blend mask from the panoramic canvas and the new image is generated. Next, there are computed Laplacian pyramids of the images and Gaussian pyramids of the masks in the bounded rectangular areas of the overlap regions. Multi-resolution blending is used to blend the Laplacian and Gaussian pyramids. Finally, the blended images is copied onto the panoramic canvas, which may hold other images.

The flowchart for this procedure, generally speaking, is along the lines as shown conceptually in FIG. 5, and as can be modified from the teachings of the present invention.

(1) determine the coarsest level resolution level of a Laplacian pyramid at which two images $I_i$, $I_j$ (or I, J) are to be blended (step 504). The bottom-most level is computed from computing the inertial tensor of the images I, J, which gives an inertial ellipse having a minor axis that is used to find the number of pyramid levels in the Laplacian pyramid.

(2) From the overlapping images I, J construct a Laplacian pyramid (step 506), as is known per se in the art, starting at the finest level of resolution and working through the pyramid to more coarser levels of resolution.

(3) Generate a blend mask (step 508), preferably using the grassfire transform described herein, and construct a Gaussian pyramid from the blend mask. The Gaussian pyramid may be constructed by applying a low-pass filter to the blend mask, which dilutes the sharp edges, from linear interpolation between the black and white regions of the blend mask, or from other techniques.

(4) At each level in the Laplacian pyramid of images I, J that are to be blended, blend the overlap regions, preferably by the method of multiplying the Laplacian values of images I, J times the weighted values supplied by the Gaussian pyramid based blend mask, according to the value for I times the mask value (MV), or the value for J times the compliment of the mask value (1−MV), (step 510).

(5) Add the results at each level of the Laplacian pyramid (step 512), until the finest level resolution of the Laplacian pyramid is reached (or upon user interruption, as always) (steps 512 and 514).

(6) Perform steps (1)–(5) for all images to be blended in the blend region (step 516). Previously blended images may be blended with new images, and blending may be iterated, with human input or automatically.

The net result of these steps is that the lowest frequency component images are blended over the entire transition region, giving a desired smoother effect, while high frequency components (such as sharp edges) are blended over a smaller region, typically 3–5 pixels wide, which "sharpens" these high frequency components, as desired. Conceptually this is shown in FIG. 8, with the blending regions 802, 804, 806 for the low, middle and high frequencies being shorter, respectively, according to the functioning of the blending module as described.

The net visual effect of the blending described herein, besides producing a pleasing smoothing of images that helps eliminate ghosting, is an "auto-iris" effect, in that luminosity appears to be automatically adjusted when moving from a high intensity image to a low intensity image, similar to the adjustments made by a human eye.

Figure 11A:
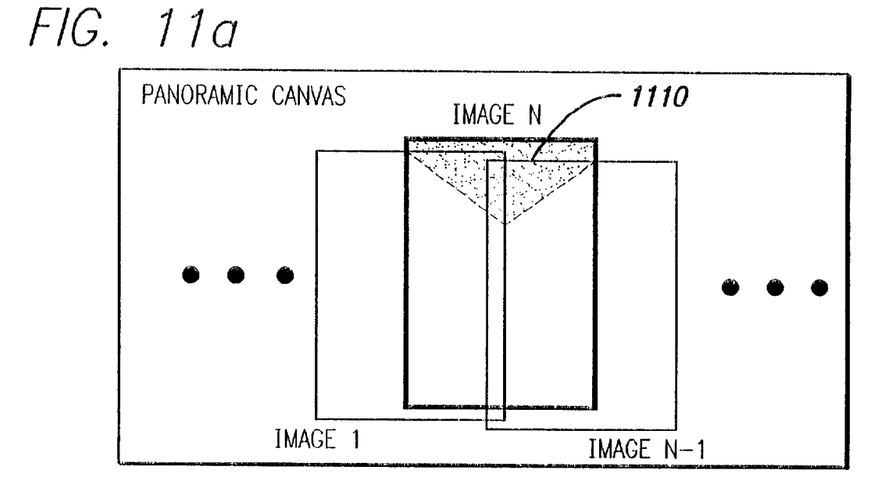
FIGS. 11(a) and (b) illustrate a particular problem overcome during blending in one embodiment of the present invention.

In practice, it has been found that on occasion, where there are overlaps of more than two images, a particular problem is encountered in the blending of images, as illustrated graphically in FIG. 11(*a*). When a first (N−1) images are sequentially blended onto the panorama canvas, and there is an attempt to blend Image N, most of the area covered by Image N is already blended by an "unintended" overlap between Image 1 and Image N−1, with the blend mask 1110 indicated generally as the gray area inside the dotted lines. As a result, Image N has little effect on the panorama even though it provides much large transition areas between Image 1 and Image N−1, and therefore has the potential to improve the quality of the panorama. In the most general case, because of the nature of panoramas, the problem illustrated by FIG. 11(*a*) has the potential to occur on occasion.

One method to solve the problem illustrated by FIG. 11(*a*) during authoring of the panorama is to allow manual input to override the computer default ordering for the blending of images. Images with larger overlaps (e.g., a very dark, low frequency image that may be a background color to a series of high frequency lighter foreground images) should be blended onto the panoramic canvas first manually, and can be selected for blending by a user of the present apparatus, through a suitable user interface that lists the images to be blended first in a priority list.

Figure 11B:
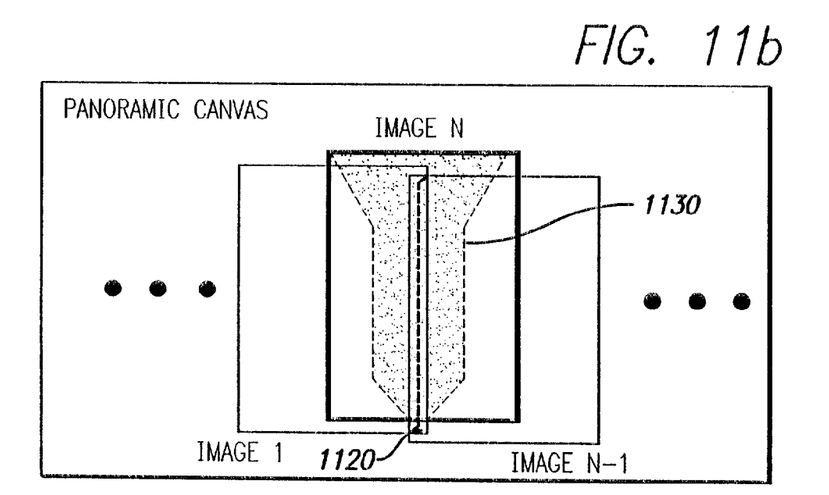

Another more automated method to solve the problem illustrated by FIG. 11(*a*) is illustrated conceptually in FIG. 11(*b*). The automated solution uses a labeling scheme. For every pixel on the panoramic canvas, which may be a blended pixel, the computer labels it with a number indicating which source image contributes the most to this pixel. In FIG. 11(*b*), the dashed line 1120 represents the blend mask boundary when Image 1 and Image N−1 are blended. The pixels on the left of the dashed line 1120 have label 1, as Image 1 contributes the most to the pixel values in that area of the panoramic canvas, while the pixels on the right side of the dashed line 1120 have label N−1, as image N−1, which may be a previously blended image, contributes the most to the pixel values in that area. When another image, Image N, needs to be blended onto the panoramic canvas, first a grassfire transform on the panoramic canvas is performed. In addition to the actual image boundaries, the dashed line 1120, representing the blend mask boundary between images Image I and Image N−1, is regarded as a virtual boundary, or "firewall", that the grassfire cannot penetrate. The virtual boundaries are computed easily using the pixel labels and the list of all intended overlaps. The resulting blend mask is illustrated as the gray area 1130 in FIG. 11(*b*), which is much larger than the blend mask area of FIG. 11(*a*). Using this "firewall" technique, the blending takes advantage of both large overlaps between Image I and Image N, and Image N and Image N−1, which alleviates the aforementioned problem associated with FIG. 11(*a*).

IV. Human Interface

Human interaction is an integral part of the method and apparatus of the present invention. The system of the present invention is trying to solve a complicated nonlinear optimization problem. No automated procedure can guarantee its convergence to a global minimum; in this sense the system is heuristic. On occasion, human interaction through a user interface can steer the system to produce a more satisfactory panorama. Some areas of possible human interaction with the system include manual projective registration, initial calibration, and feedback generally.

In manual projective registration, human interaction is sometimes beneficial in cases where the projective registration of images breaks down due to factors such as excessive exposure difference, motion in the scene, bad initial estimates, and the like. When automatic registration fails, human interaction through a user interface, such as through user interface function module 230 of FIG. 2, allows for manual registration, through a windows-based interface, such as of the type discussed in connection with FIG. 6. In this instance a human would manually initially align images more precisely (relying on eyesight and a mouse pointer, or, by manually entering via a keyboard the coordinates for positioning an image) for either pairwise local registration or global registration, in order to then allow the computer to automatically optimize the images as discussed herein. The user would not supersede the system of the present invention, but assist the system to allow for the automatic convergence to a solution.

Similarly, in initial calibration, e.g., step 314 in the embodiment of FIG. 3, the number of camera internal and external parameters is large in the general case. The global optimization function module needs initial conditions in order to converge to the right answer. A user interface, such as of the kind discussed in FIG. 6, provides an interactive tool to initialize those parameters. Thus, in the event the user has more accurate information about initial parameters than is supplied by the computer default parameters, the user can input those parameters.

Figure 12:
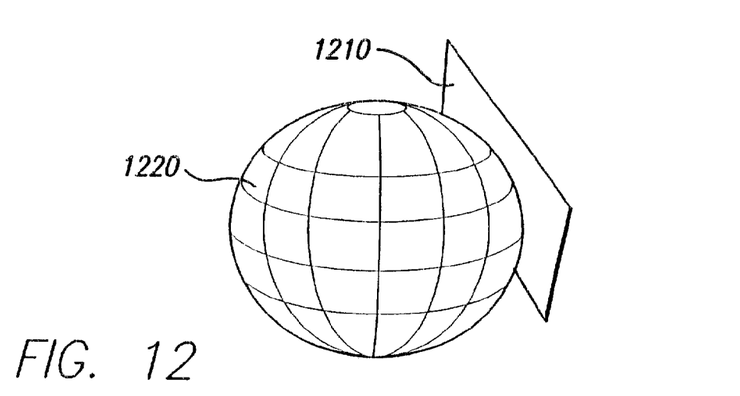
FIG. 12 illustrates a particular virtual reality orientation of images for the user interface for one embodiment of the present invention.

Human interaction is present throughout to provide feedback to the computer system of the present invention. The system must have the ability to provide feedback in all the nonlinear optimizations to let users monitor the progress of the system, and allow them to intervene when necessary. In a preferred embodiment, the user interface for human interaction may be a real-time texture map engine which simulates a virtual camera looking out from the common nodal point of the rectilinear images. All images are seen floating in 3D space. The user can select any image and change its internal and external parameters interactively in real time. In one preferred embodiment, the images may be seen as if the user was situated inside of a sphere, termed a spherical coffee-table, illustrated conceptually as virtual reality space in FIG. 12, with the images 1210 presented tangent to the outside of the viewing sphere 1220. The arrangement of the images outside the sphere may be arranged by a virtual reality type authoring user interface, with the user free to arrange which images will be blended, and where, by placing the images at selected tangents on the viewing sphere 1220. Details of this interface can be implemented by one of ordinary skill in the art using the teachings of the present invention. The images, once selected by a user, are pairwise registered, calibrated, globally optimized and blended, as taught herein, to construct a panorama that may then be projected onto a sphere, producing a 3D panorama viewing space.

Although the present invention has been described in terms of the preferred embodiments above, numerous modifications and/or additions to the above-described preferred embodiments would be readily apparent to one skilled in the art. It is intended that the scope of the present invention extends to all such modifications and/or additions and that the scope of the present invention is limited solely by the claims set forth below.

We claim:

1. A method for creating a panoramic image from a plurality of rectilinear images obtained from a camera, the method comprising:

estimating a projective transformation during a pairwise registration process between at least two overlapping rectilinear images obtained from a camera, said projective transformation providing a Hessian matrix relating the at least two rectilinear images;

determining a vector of internal parameters and a vector of external parameters from the Hessian matrix to minimize image discrepancy in an overlapping region between the at least two overlapping rectilinear images during a process of global optimization; and blending the at least two images to provide a smooth transition between the at least two images.

2. The method according to claim 1, wherein the projective transformation is a 3×3 matrix comprising 9 projective parameters.

3. The method according to claim 1, wherein the pairwise registration process includes a local registration error function between the at least two images, $$e_{ij} = \frac{1}{A_{ij}} \sum_{overlap} (s_{ij} I_j(X_j) + b_{ij} - I_i(M_{ij} X_j))^2.$$

4. The method according to claim 3, wherein the Hessian matrix, $C_{ij}$, between the at least two images is determined from the local registration error function, $$e_{ij}(M_{ij}) \approx e_{ij}{}^0 + (M_{ij} - M_{ij}{}^0)^T C_{ij} (M_{ij} - M_{ij}{}^0).$$

5. The method according to claim 1, wherein the vector of internal parameters comprise of image center position, aspect ratio, and focal length.

6. The method according to claim 1, wherein the vector of external parameters represents the camera orientation with respect to a common frame of reference.

7. The method according to claim 4, wherein a global error function that is optimized during the global optimization process is defined by a function of the product of overlap area between the at least two images and the local registration error function.

8. The method according to claim 1, wherein the blending is performed such that high frequency signals in the overlapping region between the at least two images are blended over a narrow blend region range.

9. The method according to claim 1, wherein the blending is performed such that low frequency signals in the overlapping region between the at least two images are blended over a wide blend region range.

10. A system for creating a panoramic image from a plurality of rectilinear images obtained from a camera, the system comprising:

a processor for estimating a projective transformation during a pairwise registration process between at least two overlapping rectilinear images obtained from a camera, said projective transformation providing a Hessian matrix relating the at least two rectilinear images;

a global optimizer for determining a vector of internal parameters and a vector of external parameters from the Hessian matrix to minimize image discrepancy in an overlapping region between the at least two overlapping rectilinear images; and a blender for blending the at least two images to provide a smooth transition between the at least two images.

11. The system according to claim 10, wherein the projective transformation is a 3×3 matrix comprising 9 projective parameters.

12. The system according to claim 10, wherein the pairwise registration process includes a local registration error function between the at least two images, $$e_{ij} = \frac{1}{A_{ij}} \sum_{overlap} (s_{ij} I_j(X_j) + b_{ij} - I_i(M_{ij} X_j))^2.$$

13. The system according to claim 12, wherein the Hessian matrix, $C_{ij}$, between the at least two images is determined from the local registration error function, $$e_{ij}(M_{ij}) \approx e_{ij}^0 + (M_{ij} - M_{ij}^0)^T C_{ij}(M_{ij} - M_{ij}^0).$$

14. The system according to claim 10, wherein the vector of internal parameters comprise of image center position, aspect ratio, and focal length.

15. The system according to claim 10, wherein the vector of external parameters represents the camera orientation with respect to a common frame of reference.

16. The system according to claim 13, wherein a global error function that is optimized by the global optimizer is defined by a function of the product of overlap area between the at least two images and the local registration error function.

17. The system according to claim 10, wherein the blending is performed such that high frequency signals in the overlapping region between the at least two images are blended over a narrow blend region range.

18. The system according to claim 10, wherein the blending is performed such that low frequency signals in the overlapping region between the at least two images are blended over a wide blend region range.

19. A method for creating a panoramic image from a plurality of rectilinear images obtained from a camera, the method comprising:

estimating a projective transformation during a pairwise registration process between at least two overlapping rectilinear images obtained from a camera, said projective transformation providing a Hessian matrix relating the at least two rectilinear images;

determining a vector of internal parameters and a vector of external parameters from the Hessian matrix to minimize image discrepancy in an overlapping region between the at least two overlapping rectilinear images during a process of global optimization;

blending the at least two images to provide a smooth transition between the at least two images; and mapping the blended images onto a three dimensional geometry surface.

20. The method according to claim 19, wherein the three dimensional geometry surface is a sphere.

* * * * *

UNITED STATES PATENT AND TRADEMARK OFFICE
CERTIFICATE OF CORRECTION

PATENT NO.    : 6,549,651 B2
DATED         : April 15, 2003
INVENTOR(S)   : Yalin Xiong and Ken Turkowski It is certified that error appears in the above-identified patent and that said Letters Patent is hereby corrected as shown below:

<u>Title page,</u>
Item [73], Assignee, replace "Apple Computers, Inc." with -- Apple Computer, Inc. --.

Signed and Sealed this

Twenty-sixth Day of August, 2003

JAMES E. ROGAN
*Director of the United States Patent and Trademark Office*